June 27, 1939. A. L. BROCK 2,163,571
AUXILIARY ACCELERATOR PEDAL
Filed Feb. 2, 1939
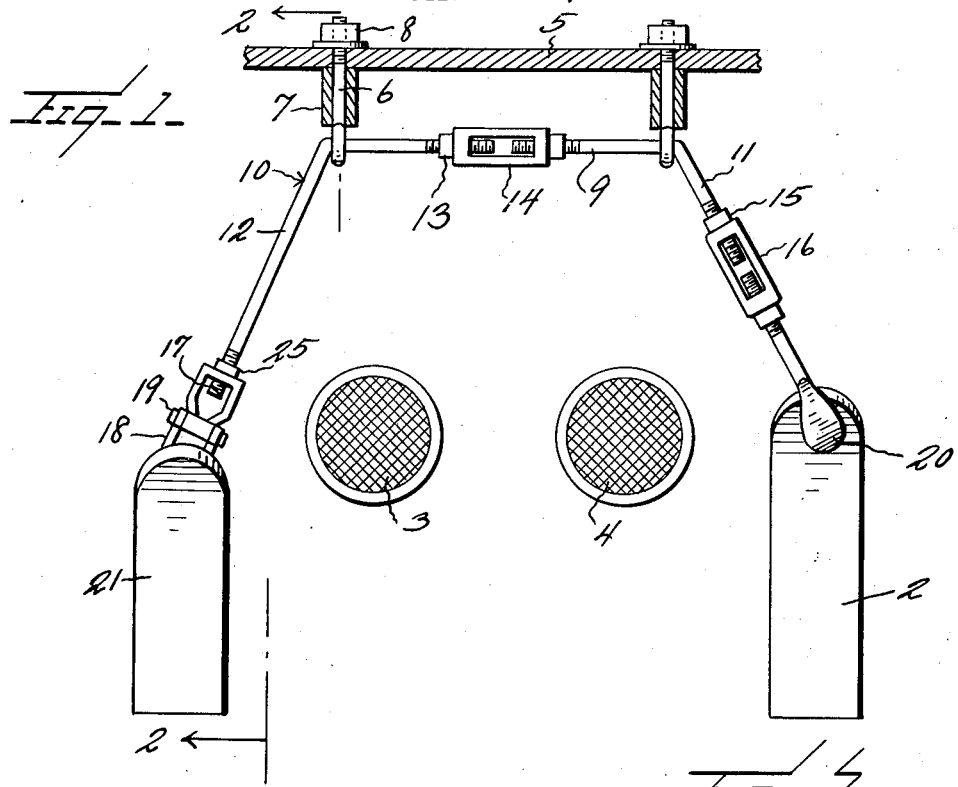
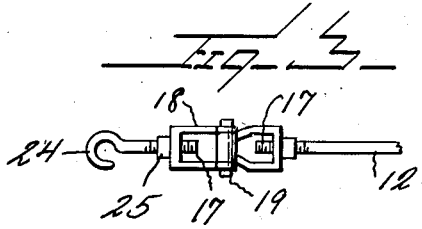
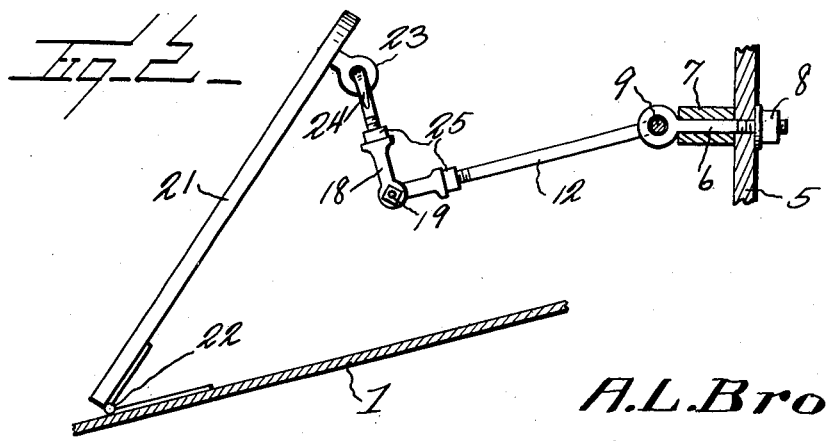
Inventor
A. L. Brock
By Watson E. Coleman
Attorney Patented June 27, 1939

2,163,571

UNITED STATES PATENT OFFICE 2,163,571

AUXILIARY ACCELERATOR PEDAL

Albert L. Brock, Buffalo, Wyo.

Application February 2, 1939, Serial No. 254,283

4 Claims. (Cl. 74—513)

This invention relates to the class of levers or lever actuators and pertains particularly to improvements in devices for facilitating the operation of the accelerator pedal of a motor vehicle.

In the operation of motor vehicles, occasions arise upon which it would be an advantage or help to the vehicle operator to work or control the accelerator pedal with his left foot while using the right foot upon the brake pedal and the present invention has for its primary object to provide a simple easily installed device which will make it possible for a vehicle operator to control or depress the foot accelerator of his car with his left foot, thus making it possible for the operator to use the right foot for the control of the foot brake pedal.

Another object of the invention is to provide a device of the above described character which, when installed, will be out of the way of the regular foot brake and clutch pedals and which will not interfere in any way with the movement of the driver's feet over the floorboard of the car in front of such pedals.

Still another object of the invention is to provide a device of the above described character which may be readily adjusted to different types of cars so that it will operate efficiently in association with either treadle, button or lever types of foot accelerators.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in plan of the mechanism embodying the present invention, showing the same in operative position with relation to clutch and foot brake pedals.

Fig. 2 is a sectional view on the line 2—2 of Fig. 1.

Fig. 3 is a detail plan of the broken turnbuckle.

Referring now more particularly to the drawing, the numeral 1 designates a portion of the inclined forward part of the floor of a motor vehicle upon which is mounted the accelerator pedal 2 and through which extends the usual levers for the clutch and foot brake pedals which are indicated by the numerals 3 and 4, respectively. In advance of the floor section 1 is the vertical dash 5.

In the present invention there is provided the pair of eye bolts 6, each of which has its shank extended through a sleeve 7 which is disposed against the face of the dashboard, and through the dashboard as shown, having upon its rear end the nut 8 which abuts the rear side of the dashboard and draws the head or eye portion of the eye bolt into firm contact with the forward end of the sleeve. Each of the eye bolts thus forms a hinge as will be readily seen and these bolts are mounted in a horizontal line and upon opposite sides of the steering shaft of the vehicle.

The eyes of the U-bolts 6 are arranged to receive the intermediate portion 9 of a substantially U-shaped frame which is indicated generally by the numeral 10, this intermediate portion of the frame constituting a rock shaft while the terminal or arm portions 11 and 12 operate as levers as hereinafter described.

The shaft portion 9 of the frame is broken to form the threaded ends 13 which are connected by a turnbuckle 14 and each of the levers or terminal portions 11 and 12 is likewise broken, the lever portion or arm 11 having the two ends 15 thereof screw threaded and connected by the turnbuckle 16 while the lever portion 12 has its ends 17 screw threaded, as shown, and joined to the two sections of a two-part or broken turnbuckle which is indicated generally by the numeral 18. This broken turnbuckle 18 has the two sections thereof joined together by a pivot bolt 19 so that this particular buckle serves the dual function of a turnbuckle and hinge.

The terminal portions or levers 11 and 12 of the frame are arranged in rearwardly divergent relation and the free end of the portion 11 terminates in a flat head 20 which is adapted to engage over the end of the adjacent accelerator pedal 2.

Upon the opposite side of the two pedals 3 and 4, from the accelerator pedal 2, there is located an auxiliary or left foot pedal 21 which is pivotally supported as at 22, and which has an eye 23 upon its underside for connection with the hook portion 24 which forms the terminal for the lever 12.

At each end of each of the three turnbuckles referred to, a lock nut 25 is threaded onto the threaded part which connects with the turnbuckle. These lock nuts serve, as will be readily apparent, to prevent accidental misadjustment of the parts after the shaft 9 or the levers have been adjusted to the proper length to suit the car upon which the device is mounted.

It will be readily apparent that in addition to serving as a means for adjusting the length of the lever 12, the turnbuckle 18 functions as a hinge joint in the lever so that the auxiliary or left foot pedal 21 may be freely oscillated.

It will also be readily apparent from the foregoing that with the device herein described, the operation of the regular accelerator pedal 2 may be easily and quickly accomplished by the use of the left foot upon the auxiliary pedal 21 as depression of this pedal will effect the swinging downward of the lever arm 12 and the rocking of the shaft 9 with a corresponding down swing of the lever 11 which will depress the regular accelerator pedal.

While there has been illustrated and particularly referred to an accelerator pedal of the type wherein the entire foot is supported, it will be understood that the present device is designed for use in association with a button type of accelerator or a lever type. By means of the adjustments which can be made through the medium of the turnbuckles, the control can be easily adjusted to suit any type of accelerator and also to function satisfactorily regardless of the exact position in which the accelerator is placed on the floorboard.

What is claimed is:

1. An auxiliary operator for a motor vehicle accelerator, comprising a substantially U-shaped frame having an intermediate portion and two divergently related side portions, means for pivotally supporting said intermediate portion horizontally adjacent the floorboard of the motor vehicle, the end of one of said side portions being designed for engagement upon the accelerator pedal, an auxiliary pedal pivotally mounted adjacent the opposite side of the frame, and a hinge connection between the auxiliary pedal and the said opposite side portion of the frame.

2. An auxiliary operator for a motor vehicle accelerator pedal, comprising a substantially U-shaped frame having a straight central portion and divergently related side portions constituting levers, a pair of supporting elements each formed for hinge connection with said central portion whereby the latter may be supported horizontally adjacent the vehicle floorboard and said levers may extend rearwardly over the floorboard, one of said levers at one end being formed for engagement with the vehicle accelerator pedal, an auxiliary pedal pivotally mounted upon the vehicle floorboard adjacent the end of the other lever, a pivotal connection between the said end of the other lever and the auxiliary pedal, and a hinge joint in the said other lever.

3. An auxiliary operator for a motor vehicle accelerator pedal, comprising a substantially U-shaped frame having a straight central portion and divergently related side portions constituting levers, a pair of supporting elements each formed for hinge connection with said central portion whereby the latter may be supported horizontally adjacent the vehicle floorboard and said levers may extend rearwardly over the floorboard, one of said levers at one end being formed for engagement with the vehicle accelerator pedal, an auxiliary pedal pivotally mounted upon the vehicle floorboard adjacent the end of the other lever, a pivotal connection between the said end of the other lever and the auxiliary pedal, each of said levers and the said central portion of the frame being broken and having the adjacent ends screw threaded, and a turnbuckle threadedly coupling the said adjacent ends of the broken levers and central portion.

4. An auxiliary operator for a motor vehicle accelerator pedal, comprising a substantially U-shaped frame having a straight central portion and divergently related side portions constituting levers, a pair of supporting elements each formed for hinge connection with said central portion whereby the latter may be supported horizontally adjacent the vehicle floorboard and said levers may extend rearwardly over the floorboard, one of said levers at one end being formed for engagement with the vehicle accelerator pedal, an auxiliary pedal pivotally mounted upon the vehicle floorboard adjacent the end of the other lever, a pivotal connection between the said end of the other lever and the auxiliary pedal, each of said levers and the said central portion of the frame being broken and having the adjacent ends screw threaded, a turnbuckle threadedly coupling the said adjacent ends of the broken levers and central portion, and the turnbuckle connecting the threaded ends of the lever adjacent the auxiliary pedal being in two pivotally coupled parts and operating as a downwardly breaking hinge.

ALBERT L. BROCK.